(12) United States Patent (10) Patent No.: US 12,111,149 B2
Alwar (45) Date of Patent: Oct. 8, 2024

(54) OPTO-MECHANICAL CAMERA POSITION TRACKING DEVICE

(71) Applicant: Venkatakrishnan Alwar, Chennai (IN)

(72) Inventor: Venkatakrishnan Alwar, Chennai (IN)

( * ) Notice: Subject to any disclaimer, the term of this patent is extended or adjusted under 35 U.S.C. 154(b) by 0 days.

(21) Appl. No.: 18/111,533

(22) Filed: Feb. 18, 2023

(65) Prior Publication Data

US 2024/0159527 A1 May 16, 2024

(30) Foreign Application Priority Data

Nov. 15, 2022 (IN) .............................. 202241065501

(51) Int. Cl.
*G06F 3/12* (2006.01)
*G01B 21/22* (2006.01)
*G03B 17/56* (2021.01)
*G06F 3/01* (2006.01)
*H04N 23/54* (2023.01)

(52) U.S. Cl.
CPC ........... *G01B 21/22* (2013.01); *G03B 17/561* (2013.01); *G06F 3/012* (2013.01); *H04N 23/54* (2023.01)

(58) Field of Classification Search
CPC ...... G06F 3/011; G06F 3/012; G06F 2111/18; G01B 21/22; H04N 23/54; G03B 17/561; G03B 17/56; G03B 2205/00–0084
See application file for complete search history.

(56) References Cited

U.S. PATENT DOCUMENTS

2011/0280565 A1\* 11/2011 Chapman ............... F16M 11/28
396/428
2021/0321022 A1\* 10/2021 Galante .................. H04N 23/54

\* cited by examiner

*Primary Examiner* — Lisa S Landis
(74) *Attorney, Agent, or Firm* — Levine's Tech Consulting, LLC; Frank E. Levine

(57) ABSTRACT

The present invention relates to an opto-mechanical camera position tracking device which gathers real-time positional data of camera in three dimensional (3D) space and zoom value of the camera lens without using any line of sight or markers and has zero drift. The said camera tracking device attaches to an existing camera crane, detects the necessary positional and optical data, processes it, and sends it to a rendering engine for seamless, real-time visualization.

7 Claims, 5 Drawing Sheets

Dolly wheel encoder unit (100) with exploded view

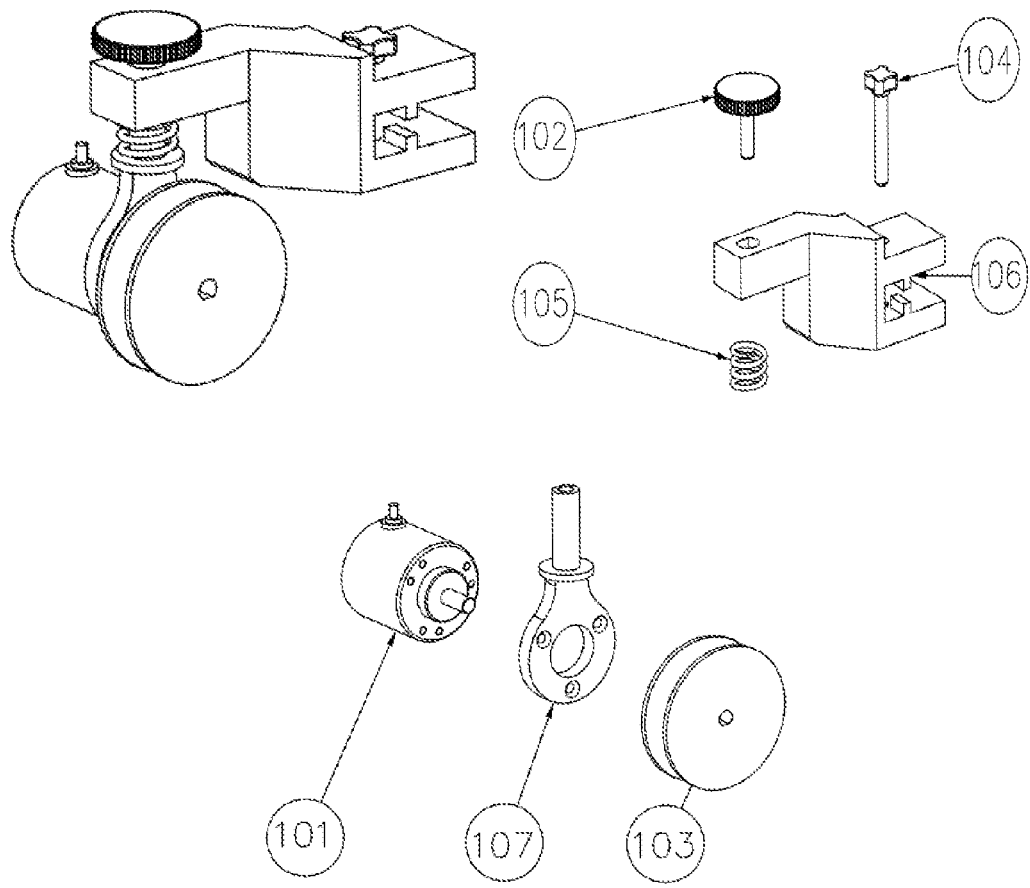
Figure 1: Dolly wheel encoder unit (100) with exploded view

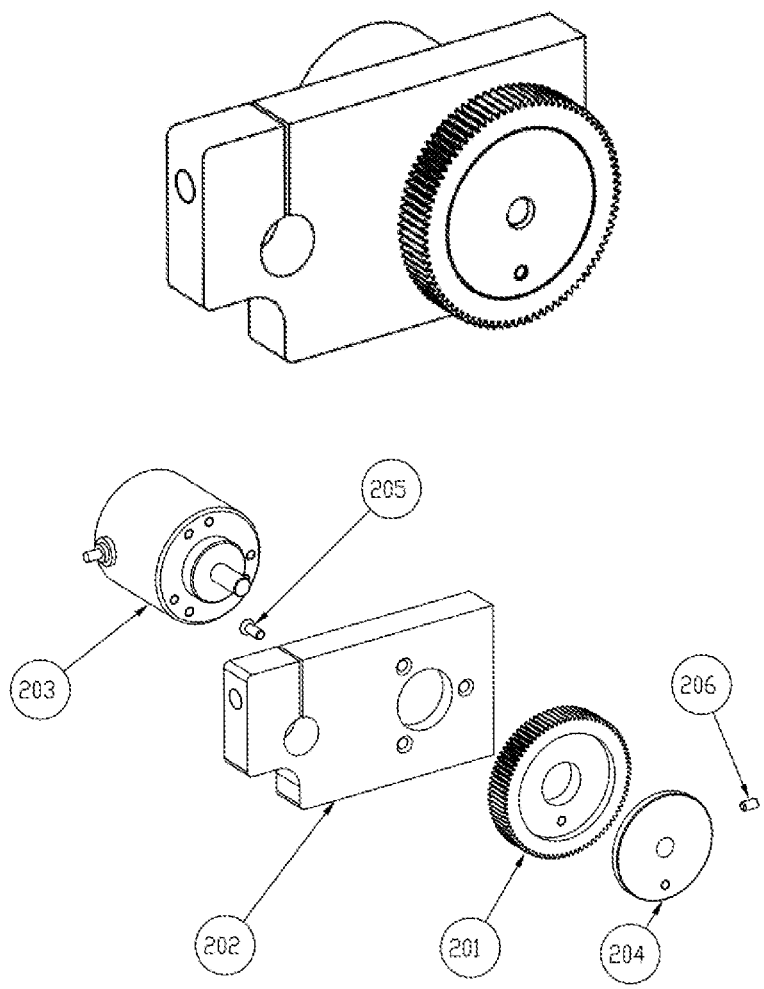
Figure 2: Lens encoder unit (200) with exploded view

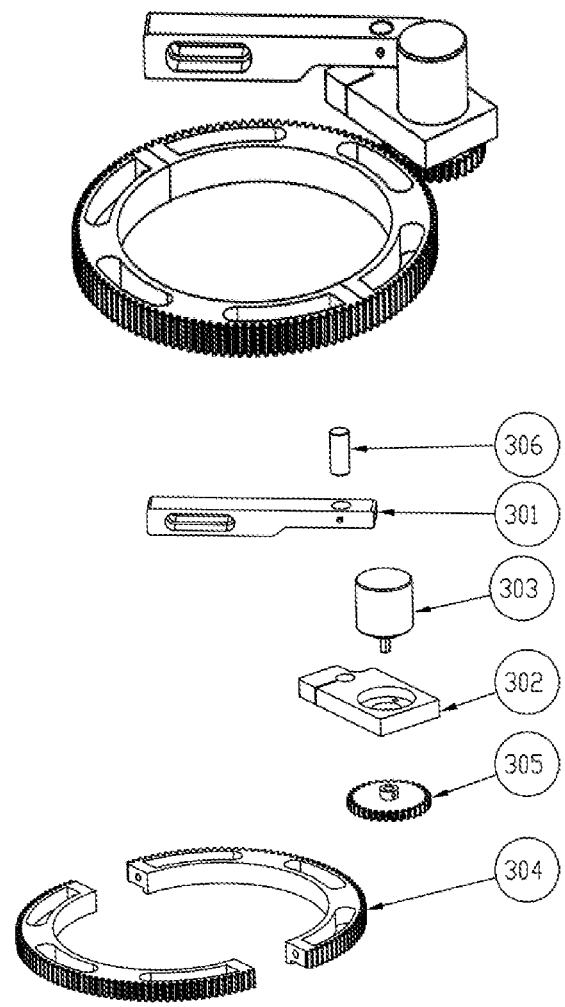
Figure 3: Pedestal pan encoder unit (300) with exploded view

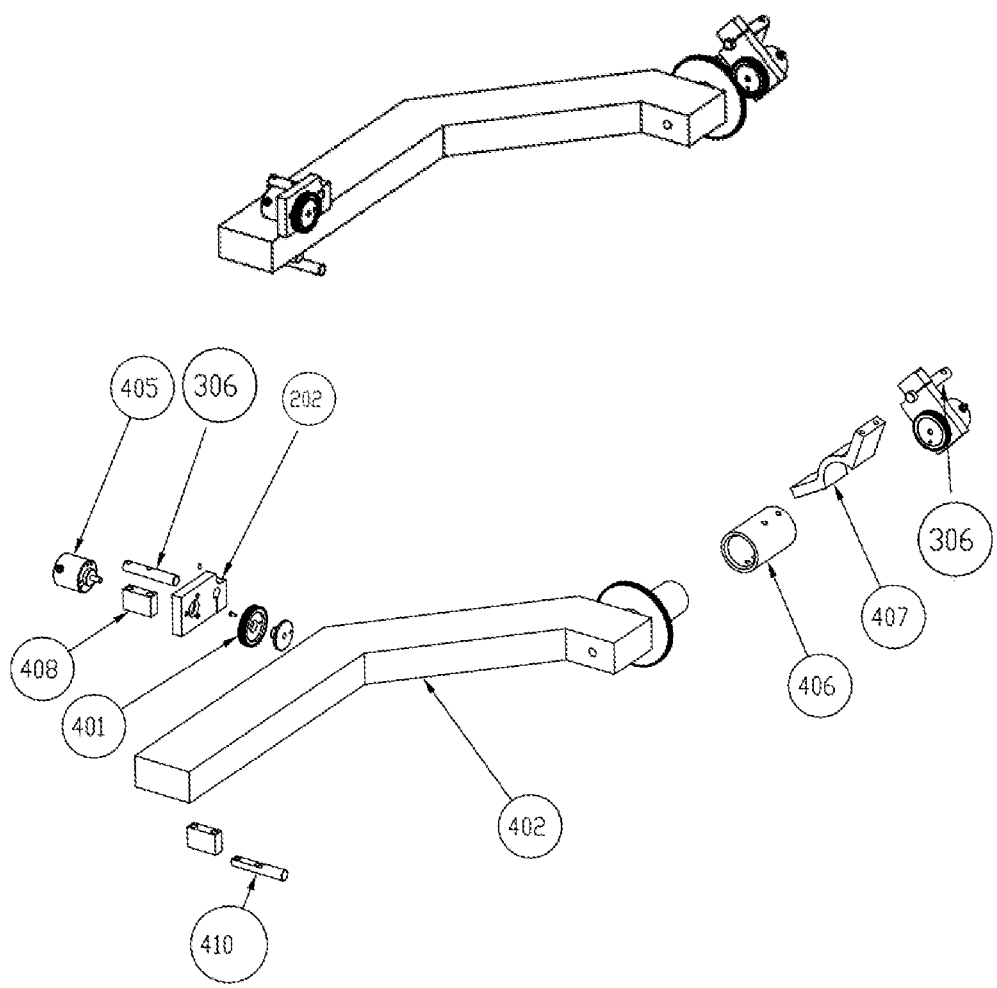
Figure 4: Head pan and Tilt encoder unit (400) with exploded view

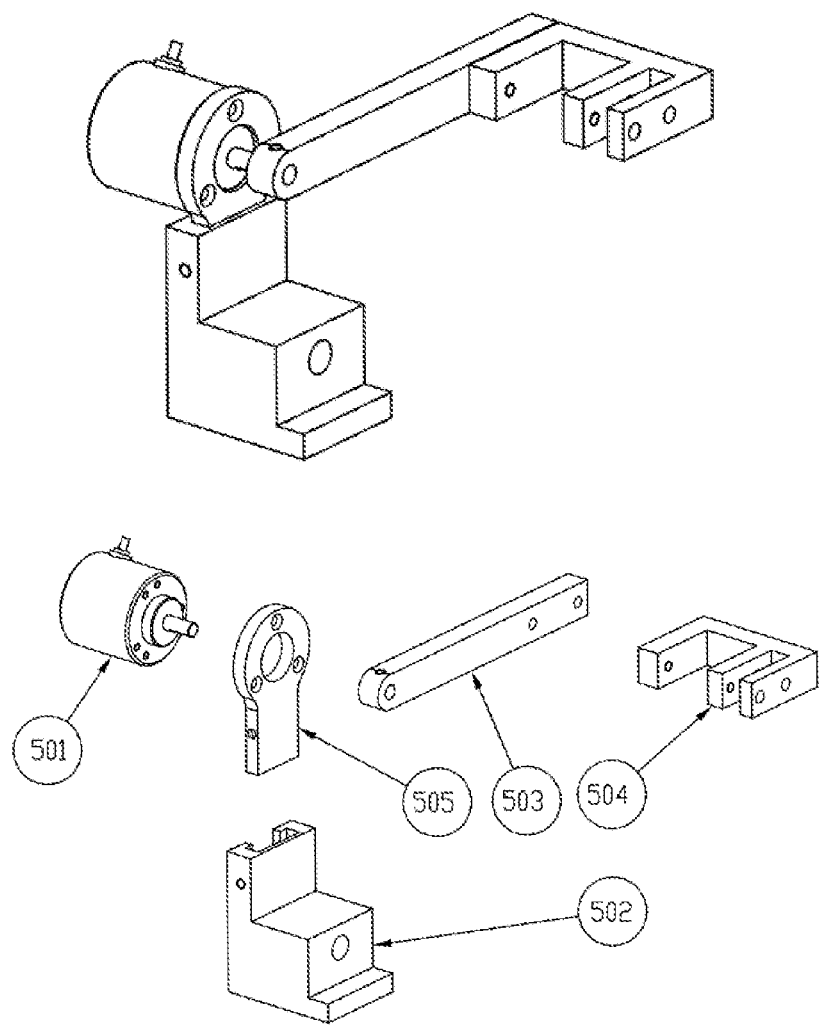
Figure 5: Pedestal Tilt encoder unit (500) with exploded view

OPTO-MECHANICAL CAMERA POSITION TRACKING DEVICE

FIELD OF INVENTION

The present invention generally relates to the field of positional tracking,

Particularly, the present invention relates to the opto-mechanical device based positional tracking of camera for virtual reality and/or augmented reality applications with improved features and characteristics.

BACKGROUND OF THE INVENTION

Virtual Reality (VR) comprises a computer simulated environment that can simulate a physical presence in places in the real world or imagined worlds. Conventionally, virtual reality environments are primarily visual experiences, displayed on a screen (e.g., and viewed by a user using 3D glasses) or through special stereoscopic display head gear. The simulated environments can be configured to be similar to the real world in order to create lifelike experiences, or the simulated environments can differ significantly from the real word, such as in VR games.

Augmented Reality (AR) generally refers to a computer simulated environment combined with the real world. Conventionally, the elements of the real world are augmented with computer generated graphics. Often, translucent stereoscopic headsets are worn by the user in AR simulations to enable a wearer to view the real world through the headset while also being able to view computer generated graphics.

Movement of participants and/or objects in interactive VR and AR simulations may be tracked using various methods and devices such as magnetic tracking, acoustic tracking, inertial tracking, optical tracking with or without markers varying in parameters such as tracking precision, tracking volume, tracking markers, manufacturing cost, and complexity of user setup.

Certain positional tracking systems currently known in the art fully or partially rely on tracking markers attached to objects, and then track the marked objects. In such systems, a tracked object typically must be covered with large tracking markers that can encode several bits of data, such that typically only large objects can be tracked.

For this reason most such systems, known as "PTAM/SLAM systems" (acronyms for Positional Tracking and Mapping for Small AR Workspaces, and Simultaneous Localization and Mapping, respectively), locate the camera on the head-mounted displays (HMD) and place the tracking markers on the walls of the environment. This approach has several disadvantages, for example: it typically requires the VR user to greatly modify the appearance of his or her environment by covering all viewing directions with large tracking markers; it typically requires the user to perform a complex calibration step in order to the map the environment; and the tracking cameras attached to the HMD typically require a good lens for precise tracking, and this increases the weight of the HMD, typically significantly. Since the tracking markers are typically complex in design in such implementations, their decoding is usually performed on the PC instead of an onboard processor in or near the HMD, and this typically increases the amount of data sent from the camera to the computer and the tracking latency.

The fixed sensors and markers should have a clear line of sight with the camera else there will be drift, lag or black out in the video output. This restrains the creative and technical team to seamlessly work in the given shooting environment. The current camera trackers restrict the movement of the camera confined to the area where line of sight is available between the camera and the markers or sensors. This constrains the creative and technical team to think beyond and deliver. The current camera tracking requires substantial time to calibrate for individual cameras and a specific lens. This results in high set up time and also a large amount of time to change from one camera lens to another, thereby resulting in huge loss of the shooting time on the production days. Most of the camera tracking systems are fixed and those camera tracking systems which are dismantlable and mountable are not easy to move, not easy to set up and not easy to calibrate. Most of the camera tracking systems cannot work outdoors due to various above listed limitations.

Therefore, in light of foregoing discussion, there exists a need to overcome the drawbacks associated with the existing state of the art.

The present invention describes an opto-mechanical camera position tracking device.

OBJECT OF THE INVENTION

The primary object of the present invention is to provide an opto-mechanical camera position tracking device.

Further object of the present invention is to provide a camera position tracking device which gathers real-time positional data of camera in three-dimensional (3D) space and zoom value of the camera lens.

SUMMARY OF THE INVENTION

Embodiments of the present disclosure present technological improvements as solution to one or more of the above-mentioned technical problems recognized by the inventor in conventional practices and existing state of the art.

The present disclosure seeks to provide an opto-mechanical camera position tracking device which gathers real-time positional data of camera in three dimensional (3D) space and zoom value of the camera lens.

According to an aspect of the present invention, the said camera tracking device attaches to an existing camera crane, detects the necessary positional data (jib, camera—pan, jib, camera—tilt) and optical data (lens—zoom), processes it, and sends it to a rendering engine using FreeD protocol.

The objects and the advantages of the invention are achieved by the process elaborated in the present disclosure.

BRIEF DESCRIPTION OF DRAWINGS

The accompanying drawings constitute a part of this specification and illustrate one or more embodiments of the invention. Preferred embodiments of the invention are described in the following with reference to the drawings, which are for the purpose of illustrating the present preferred embodiments of the invention and not for the purpose of limiting the same.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denotes the same elements.

In the drawings:

FIG. 1 illustrates the dolly wheel encoder unit (100) in accordance to the embodiment of the present invention;

FIG. 2 illustrates the lens encoder unit (200) in accordance to the embodiment of the present invention;

FIG. 3 illustrates the pedestal pan encoder unit (300) in accordance to the embodiments of the present invention;

FIG. 4 illustrates the head pan and tilt encoder unit (400) in accordance to the embodiments of the present invention;

FIG. 5 illustrates the pedestal tilt encoder unit (500) in accordance to the embodiments of the present invention.

DETAILED DESCRIPTION OF THE INVENTION

The following detailed description illustrates embodiments of the present disclosure and ways in which the disclosed embodiments can be implemented. Although some modes of carrying out the present disclosure have been disclosed, those skilled in the art would recognize that other embodiments for carrying out or practicing the present disclosure are also possible.

The present invention describes an opto-mechanical camera position tracking device.

Typical prior arts lack in the ability to track the position of camera and camera data to use it for virtual production in films and augmented reality graphics in broadcast industry seamlessly in real time.

The embodiments of the present invention relate to an opto-mechanical camera position tracking device which gathers real-time positional data of camera in three-dimensional (3D) space and zoom value of the camera lens. The said camera tracking device attaches to an existing camera crane or jib, detects the necessary positional and optical data, processes it, and sends it to a rendering engine for seamless, real-time visualization.

According to the embodiments of the present invention, the camera position tracking device comprises of a Dolly Wheel Encoder Unit (100); a Lens Encoder Unit (200); a Pedestal Pan Encoder Unit (300); a Head Pan and Tilt Encoder Unit (400) and a Pedestal Tilt Encoder Unit (500).

The dolly wheel encoder unit (100) consists of an encoder (101), an encoder shaft screw (102), an encoder wheel (103), a grub screw (104), a spring (105), a trolley wheel extension rod (106) and a wheel encoder mounting plate (107).

The jib pedestal is mounted on the wheels and placed on the track. The Dolly Wheel Encoder (100) along with its parts is fixed to the base of the jib pedestal to collect the rotational data of the wheels.

When the jib is moved on the track, the encoder wheel (103) rotates and the rotational data of the wheel is converted to digital data. The digital data is sent to the printed circuit board PCB through the cables. The PCB along with the processor converts the data to FreeD protocol and sends the FreeD protocol to the computer system.

The lens encoder unit (200) consists of a teeth (201), a drive mounting bracket (202), an encoder (203), a hub (204), and a grub screw (206).

The focus of a camera consists a of ring with gear teeth. The Lens encoder Unit (200) along with its components are fixed to the gear teeth of the focus ring of a camera to collect the rotational data of the gear teeth.

The gear teeth in the ring moves when the focus of the camera is adjusted. The rotational data of the gear teeth is converted to digital data. The digital data is sent to the PCB through the cables. The PCB along with the processor converts the data to FreeD protocol and send the FreeD protocol to the computer system. The Lens Encoder Unit (200) can also process the zoom data.

The pedestal pan encoder unit (300) consists of a dolly wheel encoder (301), a gear (304), a pinion gear (305) and a shaft (306).

The Jib Arm is mounted above the jib pedestal. The Pedestal Pan Encoder Unit (300) along with its parts mentioned above is fixed to the connecting point of the Jib Arm and Jib Pedestal.

When the Jib Arm is moved left and right (Pan Left, Pan Right), the mounted gear beneath the Jib Arm rotates and the rotational data of the gear is converted to digital data. The digital data is sent to the PCB through the cables. The PCB along with the processor converts the data to FreeD protocol and send the FreeD protocol to the computer system.

The head pan and tilt encoder unit (400) consists of a teeth gear (401), an arm (402), an attachment shaft (306), drive mounting bracket (202), encoder (405); a head pan encoder clamp (406), a head pan encoder clamp connector (407), a tilt encoder mounting block (408), a tilt encoder mounting shaft (306), and a tilt encoder mounting shaft tap (410).

The Camera is mounted on the Jib head. The Head Pan and Tilt Encoder Unit (400) along with its parts is fixed to the Jib Head.

When the Jib Head is moved left and right (Pan Left, Pan Right) or moved up and down (Tilt Up, Tilt Down), the mounted gear near the Jib Head rotates and the rotational data of the gear is converted to digital data. The digital data is sent to the PCB through the cables. The PCB along with the processor converts the data to FreeD protocol and send the FreeD protocol to the computer system.

The pedestal tilt encoder unit (500) consists of an encoder (501), a pedestal tilt block (502), a pedestal tilt block arm (503), a pedestal tilt block connect (504), a pedestal tilt block motor mount (505).

The Jib Arm is mounted above the Jib pedestal. The Pedestal Tilt Encoder Unit (500) with its parts is fixed to the connecting point of the Jib Arm and Jib Pedestal.

When the Jib Arm is moved up and down (Tilt Up, Tilt Down), the mounted gear beneath the Jib Arm rotates and the rotational data of the gear is converted to digital data. The digital data is sent to the PCB through the cables. The PCB along with the processor converts the data to FreeD protocol and send the FreeD protocol to the computer system.

The camera is mounted on the Jib Head, hence the entire camera movement is based on the movement of JIB.

The translation data of the JIB is taken through the connected wires from are generated with the control unit. The data includes jib forward and backward data, data from the dolly wheel, pan and tilt data from the pedestal, pan and tilt data from the head, rotation data of the head and the optical data of the lens.

The custom designed printed circuit board (PCB) with the processor is used to compile and synchronize the above-mentioned data and send it in open-source FreeD protocol which can be used by any leading virtual production engines used in broadcast and film making industry.

A visual tool simulates the working of the camera tracker in real-time for easy diagnosis and observation of the camera tracker.

As the entire camera tracker's sensors and encoders are mounted on the JIB, there are no additional markers and sensors necessary to be mounted in the ceiling or walls, hence the camera tracker provides easy working environment for the technical crew and is not defined or restricted by a specific perimeter. Also, this feature allows the present invention to be used in outdoors seamlessly.

The present invention is an external marker less and encoder based camera tracking system which reduces the set up time substantially to couple of hours and eliminates the lag, drift and blackout because no line of sight is requred. Entire camera tracker's sensors and encoders are mounted on the jib. It is easily portable and hence can be used both indoor and outdoor.

According to the embodiments of the present invention, the present invention provides easy set up and calibration and also enables to easily check if all the sensors are working intact. It's.

The present invention is compatible with a variety of jib, professional cameras and lenses and has auto calibration feature allows calibration of different professional cameras and lenses in less than few minutes.

The present invention allows tracking data from a camera can be streamed to multiple systems simultaneously for additional augmentation.

I claim:

1. An opto-mechanical camera position tracking device, the said device comprising:
    a dolly wheel encoder unit;
    a lens encoder unit;
    a pedestal pan encoder unit;
    a head pan and tilt encoder unit;
    a pedestal tilt encoder unit;
    a printed circuit board
characterized by mounted sensors and encoders on jib and camera and gathering of real-time positional data of camera in three-dimensional (3D) space and zoom value of the camera lens without using any line of sight or markers and has zero drift and wherein the dolly wheel encoder unit comprises an encoder, an encoder shaft screw, an encoder wheel, a grub screw, a spring, a trolley wheel extension rod, and a wheel encoder mounting plate and is fixed to the base of the jib pedestal to collect the rotational data of the wheels.

2. The device as claimed in claim 1, wherein the lens encoder unit comprises: teeth, a drive mounting bracket, an encoder, a hub, and a grub screw and is fixed to the gear teeth of the zoom ring of a camera to collect the rotational data of the gear teeth.

3. The device as claimed in claim 1, wherein the pedestal pan encoder unit consists of a dolly wheel encoder, a gear, a pinion gear, and a shaft and is connected to the intersecting point of the jib arm and jib pedestal.

4. The device as claimed in claim 1, wherein the head pan and tilt encoder unit consists of a teeth gear, an arm, an attachment shaft, drive mounting bracket, encoder, a head pan encoder clamp, a head pan encoder clamp connector, a tilt encoder mounting block, a tilt encoder mounting shaft, and a tilt encoder mounting shaft tap and is connected to the jib head having mounted camera.

5. The device as claimed in claim 1, wherein the pedestal tilt encoder unit consists of an encoder, a pedestal tilt block, a pedestal tilt block arm, a pedestal tilt block connect, and a pedestal tilt block motor mount and is connected to the intersecting point of the jib arm and jib pedestal.

6. The device as claimed in claim 1, wherein the printed circuit board with the processor is used to compile and synchronize the data and the processed data is sent to the real time rendering machine via the connectivity port for real time visualization.

7. The device as claimed in claim 1, wherein the tracking data from a camera is streamed to multiple systems simultaneously for additional augmentation.

* * * * *